United States Patent
Farahani et al.

(10) Patent No.: US 7,788,094 B2
(45) Date of Patent: Aug. 31, 2010

(54) APPARATUS, METHOD AND SYSTEM FOR MAXIMUM ENTROPY MODELING FOR UNCERTAIN OBSERVATIONS

(75) Inventors: Farhad Farahani, Los Angeles, CA (US); Fuliang Weng, Mountain View, CA (US); Qi Zhang, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 842 days.

(21) Appl. No.: 11/699,891

(22) Filed: Jan. 29, 2007

(65) Prior Publication Data

US 2008/0183649 A1 Jul. 31, 2008

(51) Int. Cl.
*G10L 15/00* (2006.01)
*G10L 15/18* (2006.01)
*G06F 17/27* (2006.01)
*G06F 7/60* (2006.01)
*G06F 17/18* (2006.01)
*G06F 17/00* (2006.01)
*G06F 5/00* (2006.01)

(52) U.S. Cl. .......................... 704/240; 704/9; 704/257; 703/2; 702/181; 706/45

(58) Field of Classification Search ....................... None
See application file for complete search history.

(56) References Cited

U.S. PATENT DOCUMENTS

| | | | | |
|---|---|---|---|---|
| 7,340,376 | B2 * | 3/2008 | Goodman | 702/181 |
| 7,464,031 | B2 * | 12/2008 | Axelrod et al. | 704/236 |
| 2006/0015484 | A1 * | 1/2006 | Weng et al. | 707/3 |
| 2008/0147574 | A1 * | 6/2008 | Chidlovskii | 706/12 |

OTHER PUBLICATIONS

Zhou, Y. et al. "A fast algorithm for feature selection in conditional maximum entropy modeling," Human Language Technology Conference, NY, pp. 185-188, 2006.*
Zhang, Q. et al. "A progressive feature selection algorithm for ultra large feature spaces," 21st Conf. on Computation Linguistics, pp. 561-568, Sydney, Jul. 2006.*
Culotta, A. et al. "Confidence estimation for information extraction," Human Language Technology Conference, Boston, Massachusetts, pp. 109-112, Year of Publication: 2004.*

* cited by examiner

*Primary Examiner*—Matthew J Sked
(74) *Attorney, Agent, or Firm*—Kenyon & Kenyon LLP

(57) ABSTRACT

A method for performing conditional maximum entropy modeling includes constructing a conditional maximum entropy model, and incorporating an observation confidence score into the model to reduce an effect due to an uncertain observation.

17 Claims, 5 Drawing Sheets

| 1. Gain computation:<br>MaxGain = 0<br>Loop<br>$\quad f_j = \arg\max_{f \in F}\{g[1,...,F]\}$<br>$\quad$ if $g[j] \leq$ MaxGain then go to step 2<br>$\quad$ else<br>$\quad\quad \hat{\alpha} = \arg\max_{\alpha} G_{S \cup f_j}(\alpha)$<br>$\quad\quad \hat{g} = \max_{\alpha} G_{S \cup f_j}(\alpha)$<br>$\quad\quad g[j] = \hat{g}$<br>$\quad\quad$ if MaxGain $< \hat{g}$ then<br>$\quad\quad\quad$ MaxGain $= \hat{g}$<br>$\quad\quad\quad f^* = f_j$<br>$\quad\quad\quad \alpha^* = \hat{\alpha}$ |
|---|
| 2. Feature selection:<br>$S = S \cup \{f^*\}$ |
| 3. if termination condition is met, then stop |
| 4. Model adjustment:<br>for instance $i$ such that there is $y$<br>$\quad$ and $f(x_i, y) \neq 0$ do<br>$\quad\quad z[i] \mathrel{-}= sum[i,y]$<br>$\quad\quad sum[i,y] \mathrel{*}= \exp(\alpha^* \cdot f^*(x_i, y))$<br>$\quad\quad z[i] \mathrel{+}= sum[i,y]$ |
| 5. go to step 1. |

Figure 2A $z[1..I] = Y$
$s[1..I, 1..Y] = 0$
for each feature $f_i$
    *expected* = 0
    for each output $y$
        for each instance $j$ such that $f_i(\overline{x_j}, y) \neq 0$
            $expected \mathrel{+}= f_i(\overline{x_j}, y) \times e^{s[j,y]}/z[j]$
    $\delta_i = \frac{1}{\max_{j,y} f_i^s(\overline{x_j}, y)} \log \frac{observed[i]}{expected[i]}$
    $\lambda_i \mathrel{+}= \delta_i$
    for each output $y$
        for each instance $j$ such that $f_i(\overline{x_j}, y) \neq 0$
            $z[j] \mathrel{-}= e^{s[j,y]}$
            $s[j, y] \mathrel{+}= \delta_i f_i^s(\overline{x_j}, y)$
            $z[j] \mathrel{+}= e^{s[j,y]}$

Figure 3

APPARATUS, METHOD AND SYSTEM FOR MAXIMUM ENTROPY MODELING FOR UNCERTAIN OBSERVATIONS

FIELD OF THE INVENTION

The present invention relates to an apparatus, method and system for maximum entropy modeling in which uncertain observations occur.

BACKGROUND INFORMATION

Conditional maximum entropy modeling has been utilized in several natural language processing applications that aim at modeling the conditional distribution of a class given an observation. Existing techniques assume the input or observations are deterministic. In certain real-life applications, however, such as spoken dialog systems, and speech to speech translation, observations may be uncertain and subject to speech recognition errors.

Conditional maximum entropy models have also been applied to natural language processing applications that directly work on text as observation. However, in certain applications, such as spoken dialog systems or speech to speech translation, observations are usually uncertain, and one may need to rely on non-perfect preprocessing methods, which are subject to error. Past works have ignored uncertainty in the observations and have assumed the observation is correct.

Errors in speech recognizer output may pose a problem for classification tasks, which are based on observation, including, for example, such classification tasks as topic classification, automatic question answering, spoken dialog systems, etc. In particular, erroneous observations may pose a problem for devices such as human-machine interaction systems, which are required to respond under noisy conditions. In this context, the traditional methods are vulnerable to noisy observations, which may occur, for example, when people drive a car.

SUMMARY OF THE INVENTION

The present invention relates to an apparatus, method and system for maximum entropy modeling in which uncertain observations may occur. In particular, the present invention provides an extended maximum entropy modeling framework to incorporate observations with confidence scores.

An exemplary method for extended maximum entropy modeling may increase the robustness of any classification system with respect to different types of noise, and may facilitate the operation of the system in noisy environments.

According to an exemplary embodiment and/or exemplary method of the present invention, recognition confidence scores are incorporated into the maximum entropy modeling framework to better compensate for uncertain observations. Initial experimental results have shown increased robustness and accuracy of the overall system performance.

According to an exemplary embodiment of the present invention, the extended maximum entropy modeling framework may be applied to a topic classifier in the domain of an in-car natural-language interaction system for an MP3 player, but may be also applied in other areas of statistical modeling, in particular, various applications in language understanding and dialog systems.

An exemplary method of the present invention for conditional maximum entropy modeling is provided, which includes constructing a conditional maximum entropy model, and incorporating an observation confidence score into the model to reduce an effect due to an uncertain observation.

Another exemplary method of the present invention for conditional maximum entropy modeling is provided, in which a candidate feature derived from a corpus of data is incorporated into the model based on a level of uncertainty regarding the feature.

Yet another exemplary method of the present invention for conditional maximum entropy modeling is provided, in which a contribution of a less confident feature is reduced in proportion to the level of uncertainty regarding the less confident feature.

Still another exemplary method of the present invention for conditional maximum entropy modeling is provided, in which the conditional maximum entropy model is constructed using a conditional probability distribution that maximizes the entropy.

Yet another exemplary method of the present invention for conditional maximum entropy modeling is provided, which includes incorporating soft features into the conditional maximum entropy model.

Still another exemplary method of the present invention for conditional maximum entropy modeling is provided, in which the soft features are incorporated in the conditional maximum entropy model by assigning a corresponding weight to a soft feature function and determining the resulting conditional probability distribution.

Yet another exemplary method of the present invention for conditional maximum entropy modeling is provided, in which the soft feature function can vary continuously in an interval from 0 to 1, in which values near 1 indicate a confident score and values near 0 indicate a non-confident score.

Still another exemplary method of the present invention for conditional maximum entropy modeling is provided, in which a sigmoid function is used to map the log-likelihood of the resulting conditional probability distribution.

Yet another exemplary method of the present invention for conditional maximum entropy modeling is provided, in which the sigmoid function is determined using a confidence score vector.

Still another exemplary method of the present invention for conditional maximum entropy modeling is provided, in which a beta distribution is used to relate a value of the soft feature function with respect to the confidence score vector.

Yet another exemplary method of the present invention for conditional maximum entropy modeling is provided, in which the maximum likelihood estimates of the beta distribution parameters are estimated from training data and a sample mean of the position scores and corresponding sample variance.

Still another exemplary method of the present invention for conditional maximum entropy modeling is provided, in which a flat distribution indicates that the feature is less affected by that score, and a concentrated distribution indicates the feature should be included in the model when the score is near the distribution mean and should not be included as the score deviates from the mean.

Yet another exemplary method of the present invention for conditional maximum entropy modeling is provided, in which the soft features are incorporated into feature selection for training the conditional maximum entropy model.

Still another exemplary method of the present invention for conditional maximum entropy modeling is provided, in which the feature selection includes determining gains for candidate features during an initialization stage and for only top-ranked features during each feature selection stage, ranking the candidate features in an ordered list based on the determined gains, selecting a top-ranked feature in the ordered list with a highest gain, and adjusting the conditional maximum entropy model using the selected top-ranked feature only if the top-ranked feature has an associated observation confidence score above a predetermined value.

Yet another exemplary method of the present invention for conditional maximum entropy modeling is provided, in which the soft features are incorporated into parameter estimation.

Still another exemplary method of the present invention for conditional maximum entropy modeling is provided, in which the parameter estimation includes setting elements of a normalization factor array equal to a number of output classes, the normalization factor array having a size equal to a number of training instances, setting elements of a sample matrix array to zero, the sample matrix array having a size equal to the number of training instances by the number of output classes, and for each feature, initializing an expected value to zero, and for each output and training instance such that the feature does not equal zero, updating the expected value based on a soft feature, calculating an error of the feature based on the updated expected value, an observed value, and the soft feature, modifying a corresponding weight of the feature based on the calculated error, and updating the normalization factor array and the sample array matrix based on the calculated error and the soft feature.

An exemplary embodiment of the present invention provides a processing arrangement system to perform maximum entropy modeling in which one or more candidate features derived from a corpus of data are incorporated into a model that predicts linguistic behavior, the system including a gain computation arrangement to determine gains for the candidate features, a feature ranking arrangement to rank the features based on the determined gain, a feature selection arrangement to select a feature with a highest gain, a parameter estimation arrangement to estimate weighting factors for each selected feature, and a model adjustment arrangement to adjust the model using the selected feature based on a level of uncertainty regarding the feature.

Yet another exemplary embodiment of the present invention provides a processing arrangement system to perform maximum entropy modeling in which one or more candidate features derived from a corpus of data are incorporated into a model that predicts linguistic behavior, in which the model adjustment arrangement reduces a contribution of a less confident feature in proportion to a level of uncertainty regarding the less confident feature.

Still another exemplary embodiment of the present invention provides a processing arrangement system to perform maximum entropy modeling in which one or more candidate features derived from a corpus of data are incorporated into a model that predicts linguistic behavior, in which at least one of the feature selection arrangement, the parameter estimation arrangement, and the model adjustment arrangement incorporates a soft feature.

Yet another exemplary embodiment of the present invention provides a processing arrangement system to perform maximum entropy modeling in which one or more candidate features derived from a corpus of data are incorporated into a model that predicts linguistic behavior, in which the soft feature can vary continuously in an interval from 0 to 1, and in which values near 1 indicate a confident score and values near 0 indicate a non-confident score.

Another exemplary embodiment of the present invention provides a computable readable medium having program code executable on a process arrangement for constructing a conditional maximum entropy model, and incorporating an observation confidence score into the model to reduce an effect due to an uncertain observation, in which a candidate feature derived from a corpus of data is incorporated into the model based on a level of uncertainty regarding the feature, and in which a contribution of a less confident feature is reduced in proportion to the level of uncertainty regarding the less confident feature.

An exemplary embodiment of the present invention may include a computer, microprocessor, or other suitable processing arrangement used to implement or perform the method described herein.

BRIEF DESCRIPTION OF THE DRAWINGS

FIG. 2A shows exemplary pseudo-code for use in the processing arrangement of FIG. 1A, which reflects an exemplary selective gain computation (SGC) method for feature selection, which incorporates soft features (i.e., features with values between 0 and 1).

FIG. 3 shows an exemplary Sequential Conditional Generalized Iterative Scaling technique, which incorporates soft features, and which may be used in the processing arrangement of FIG. 1A and/or in conjunction with other exemplary methods of the present invention.

DETAILED DESCRIPTION

Figure 1A:
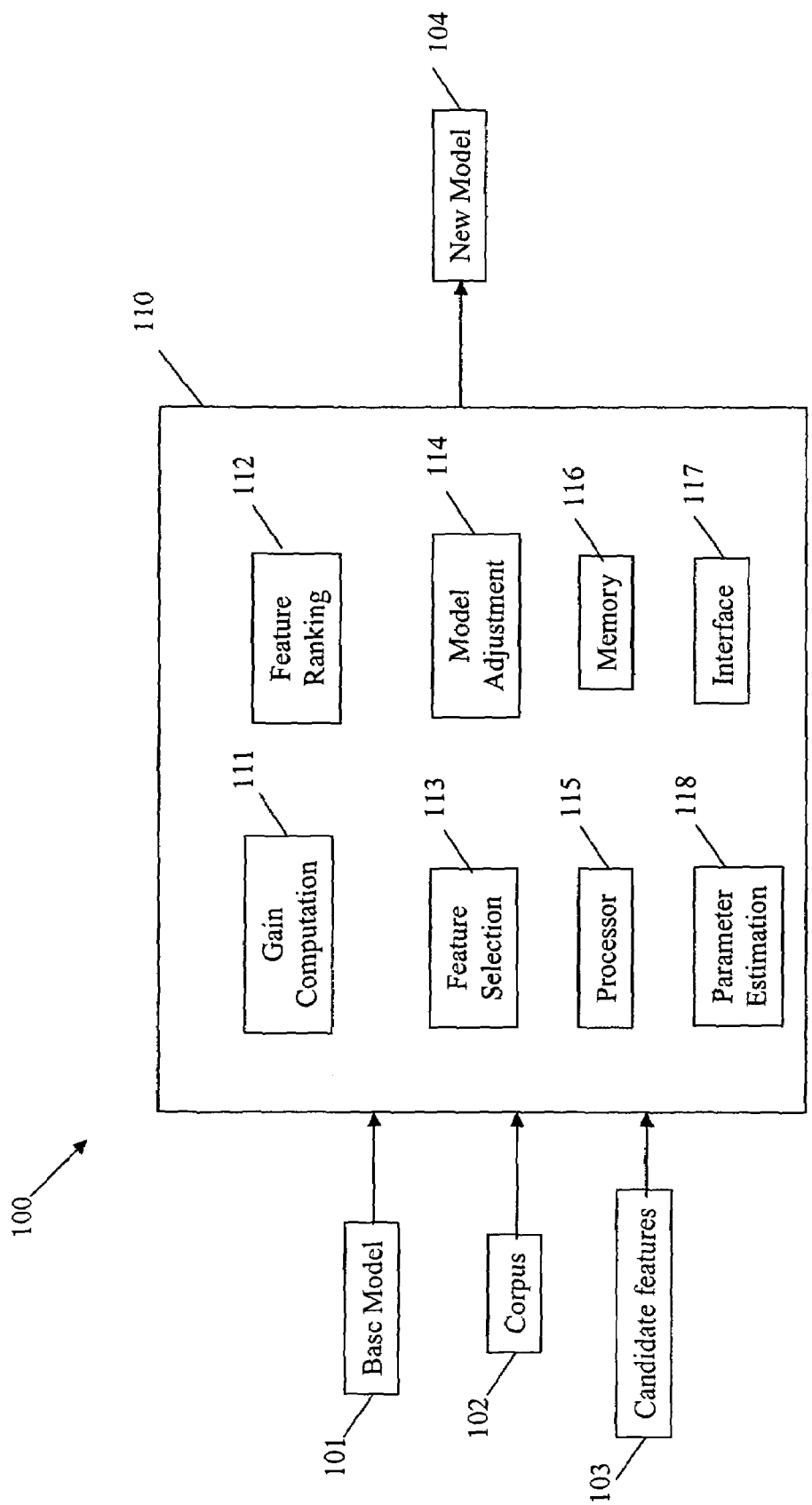
FIG. 1A shows an exemplary conditional maximum entropy modeling (CME) system and processing arrangement according to the present invention.

Conditional Maximum Entropy (CME) modeling may be applied in natural language processing applications such as language modeling, machine translation, sentence boundary detection, etc. Traditionally, in Conditional Maximum Entropy (CME) modeling, the observations are considered to be accurate. However, in real-life applications, uncertain observations may arise. For example, uncertain observations may arise in speech-to-speech translation, question answering, and speech topic classification, where the language understanding components rely upon the speech recognizer output and therefore are exposed to speech recognition errors.

In many real-life applications, the observations are accompanied by a series of corresponding confidence scores, such as an output from a speech recognizer. It has been the case that the traditional CME models ignore these confidence scores. According to an exemplary embodiment and/or exemplary method of the present invention, the confidence scores are incorporated into a CME framework in order to reduce the effect of the features that are subject to errors due to less confidently recognized words. Here, the CME model or method as well as the feature selection and parameter estimation algorithms are augmented with observation confidence scores. Accordingly, an exemplary confidence-based CME method is described as follows:

In the present CME model or method, the goal is to find the most uniform conditional distribution of a class y given an observation x, $p(y|x)$ subject to the constraints set by a set of selected features $f_i(x,y)$, where $f_j(x,y)$ is a feature function (or feature for short) that describes a certain linguistic event (x,y), and p(y|x) is the resulting conditional probability distribution that maximizes the entropy—that is, the probability that the model assigns output y in the presence of contextual information x. Traditionally, features $f_i(x,y)$ take values of either 0 and 1 in the CME framework. The constraint is to set the observed probability of the event defined by this feature equal to the corresponding probability with respect to the model. Hence, the observed and modeled empirical expectation of feature $f_i(x,y)$ are as follows:

$$\tilde{E}(f_i) = \sum_{x,y} \tilde{p}(x,y) f_i(x,y) \quad (1)$$

$$E(f_i) = \sum_{x,y} \tilde{p}(x) p(y|x) f_i(x,y) \quad (2)$$

$$\text{Constraint } E(f_i) = \tilde{E}(f_i) \quad (3)$$

Subject to the above constraints, the CME model or method should maximize the conditional entropy, which is calculated as follows:

$$H(p) = -\sum_{x,y} \tilde{p}(x) p(y|x) \log(p(y|x)) \quad (4)$$

The constrained optimization problem can be solved using the method of Lagrange multipliers, which results in the exponential model:

$$p(y|x) = \frac{1}{Z_\lambda(x)} \exp\left(\sum_i \lambda_i f_i(x,y)\right) \quad (5)$$

Where $Z_\lambda(x)$ is a normalization factor:

$$Z_\lambda(x) = \sum_y \exp\left(\sum_i \lambda_i f_i(x,y)\right) \quad (6)$$

Using the Kuhn-Tucker Theorem it can be proved that the constrained optimization problem is equivalent to finding the maximum likelihood parametric exponential model. The maximum log-likelihood of the model can be computed as follows:

$$L_{\tilde{p}}(p) = \sum_{x,y} \tilde{p}(x,y) \log p(y|x) = \sum_i \lambda_i \tilde{p}(f_i) - \sum_x \tilde{p}(x) \log Z_\lambda(x) \quad (7)$$

which is used in the feature selection and parameter estimation stages described more fully below.

In many real-life applications, observations are usually uncertain. Uncertainty in the observation vector x, reflects itself in terms of uncertainty in the corresponding features that get turned on by x. The following example is outputted by a peech recognizer and accompanied by the confidence score vector s, which is normalized between 0 and 1:

x=(Play a song by cher)s=(0.190.650.850.870.74)

The exponential model described in formula (5) gives a weight of $\lambda_i$ to the ith feature, which is the amount of contribution of that feature to the log-likelihood of a class y given an observation x. In other words, it measures the prominence of that feature in classification. However this framework does not consider the impact of uncertainty. The word play is recognized with such a low confidence that it may be very probable that the word is misrecognized. Accordingly, it may be reasonable to give more attention to the features that rely on more confidently recognized words such as song.

Therefore, the contribution of less confident features to the log-likelihood is reduced in proportion to the level of uncertainty regarding the feature. This can be incorporated into the modeling framework by introducing the concept of "soft features". Unlike binary-valued features, a soft feature $f_i^s(x,y)$ can vary continuously in the interval of [0,1]. For example, the value will be near 1 if it is confidently on, and will approach 0 as we get less and less confident about its status.

The way in which the value of the soft feature $f_i^s(x,y)$ varies with respect to the confidence-score vector is learned from the training data by estimating the conditional probability density function (pdf) of the score vector s given $ff_i(x,y)=1$. Since elements of s vary between zero and one, beta distribution is quite flexible in modeling this type of phenomena:

$$p(\vec{s} \mid f_i(x,y)=1) = \prod_j \beta eta^{\alpha_j, \beta_j}(s_j) \quad (8)$$

where j varies over all significant positions (non-don't-cares) of the i-th feature, and $\alpha_j, \beta_j$ are the maximum likelihood estimates of the beta distribution parameters, which are estimated from the training data as follows:

$$\alpha_j = \bar{s}_j \left[\frac{\bar{s}_j(1-\bar{s}_j)}{\hat{s}_j^2} - 1\right] \quad (9)$$

$$\beta_j = (1-\bar{s}_j)\left[\frac{\bar{s}_j(1-\bar{s}_j)}{\hat{s}_j^2} - 1\right]$$

Here, $\bar{s}_j$ is the sample mean of the position j scores where feature i is on and $\hat{s}^2_j$ is the corresponding sample variance. The estimated distribution demonstrates how the certainty of a feature is related to the confidence score vector. A flat distribution for $s_j$ means that the feature is not much affected by that score while a concentrated distribution means the feature should be almost on when the score is near the distribution mean and should approach zero as the score deviates from the mean. Theoretically, the distributions may be concentrated in the lower half interval, which implies that a feature should be on when the confidence is low and should turn off as the confidence goes higher. This case can happen if in the training data, the automatic speech recognizer (ASR) has frequently misrecognized a word $\omega_1$ with another specific word $\omega_2$ but with a low confidence score. In this instance, $\omega_2$ with a low confidence should be able to turn a feature on while a high confidence will not be desirable or might trigger another feature.

After learning the distributions, the soft features are computed from the confidence scores. The feature value is of the log-likelihood type (see equation (5)) but is confined to the interval [0,1]. To deal with this situation, a monotonic function, such as a sigmoid function, is used to map the log-likelihood of the distribution to the [0,1] interval.

$$f_i^s(x,y) = f_i(x,y) \text{sigmoid}(\log p(\vec{s}|f_i(x,y)=1)) \quad (10)$$

Figure 1B:
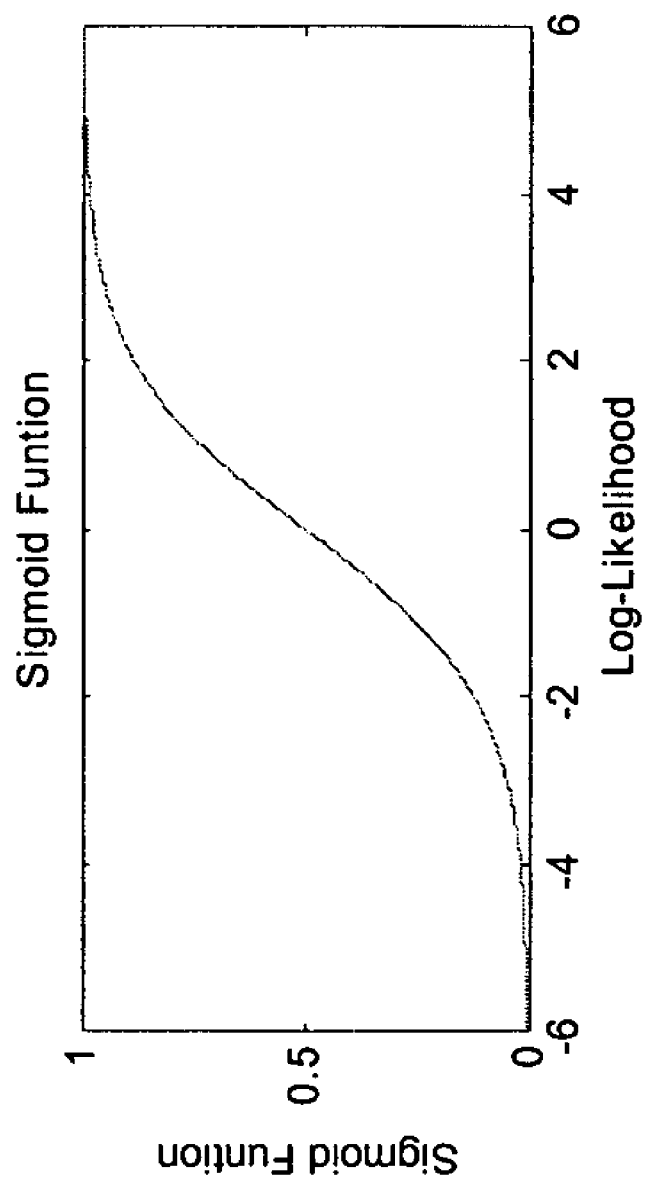
FIG. 1B shows in graphic form how a sigmoid function is used to map the log-likelihood of a conditional probability distribution to a continuous interval from 0 to 1.

FIG. 1B shows in graphic form how the sigmoid function is used to map the log-likelihood of the distribution to the [0,1] interval. As seen from FIG. 1B, the soft feature varies continuously between zero and one according to its degree of certainty.

An exemplary CME model or method according to the present invention incorporates soft features into a traditional CME model or method. In particular, the exemplary CME model or method is as follows:

$$p(y|x, s) = \frac{1}{Z_\lambda(x, s)} \exp\left(\sum_i \lambda_i f_i^s(x, y)\right) \quad (11)$$

$$Z_\lambda(x, s) = \sum_y \exp\left(\sum_i \lambda_i f_i^s(x, y)\right) \quad (12)$$

Where $f_i^s(x,y)$ is the soft feature function as described in equation (10), $\lambda_j$ is a corresponding weight of the ith feature, $Z(x,s)$ is a normalization factor, and $p(y|x,s)$ is the resulting conditional probability distribution.

To train the conditional maximum entropy model, a selective gain computation (SGC) method and generalized iterative scaling (GIS) technique may be used for providing feature selection and parameter estimation, which are described, for example, in co-pending U.S. patent application Ser. No. 10/613,366 ", entitled "A Fast Feature Selection Method and System for Maximum Entropy Modeling, which was filed Jul. 3, 2003, the disclosure of which is incorporated by reference herein in its entirety. As discussed therein, the conditional maximum entropy estimated probability is computed or determined using fast feature selection.

FIG. 1A shows an exemplary conditional maximum entropy modeling (CME) system 100 according to the present invention. The exemplary conditional maximum entropy modeling (CME) system 100 uses a selective gain computation (SGC) method to perform feature selection, in which one or more candidate features 103 derived from a corpus of data 102 are incorporated 110 into a base model 101 by a processing arrangement 110 to produce a new model 104 for predicting linguistic behavior. The corpus of data 102 may include, for example, the financial newspaper text of the Wall Street Journal from the Penn Treebank prepared by the Linguistic Data Consortium, and the base model 101 may be, for example, a uniform distribution.

The exemplary processing arrangement 110 includes a gain computation arrangement 111 to determine or compute the gains of all the candidate features 103 during the initialization stage and the gains for only the top-ranked features during each feature selection stage, a feature ranking arrangement 112 to rank features in an ordered list, a feature selection arrangement 113 to select a feature which has the highest gain in the ordered list, a model adjustment arrangement 114 to adjust the model using the selected feature, a processor 115 to perform the methods and calculations described herein, a memory 116 to store data, and an interface 117 or other suitable graphical interface (GUI) for interacting with the exemplary entropy modeling system 100. The exemplary processing arrangement 100 also includes a parameter estimation arrangement 118 to estimate the weighting factors for each selected feature.

FIG. 2A shows exemplary pseudo code reflecting an exemplary selective gain computation (SGC) method for feature selection, which incorporates soft features. The exemplary selective gain computation (SGC) method determines the gains for the top-ranked features based on the models obtained from previous stages. In this regard, an exemplary embodiment and/or method of the present invention may use techniques described, for example, in U.S. application Sr. No. 10/613,366 ", entitled "A Fast Feature Selection Method and System for Maximum Entropy Modeling", which was filed Jul. 3, 2003, the disclosure of which is incorporated by reference herein in its entirety. In particular, for each feature selection stage, the exemplary selective gain computation (SGC) method of the present invention determines the approximate gains g[j] for the top-ranked candidate features $f$, which are ranked in an ordered list of candidate features F based on the determined gains G, selects the top-ranked feature in the ordered list, and adjusts the model with the selected top-ranked feature, which is then removed from the ordered list prior to the next stage.

As shown in FIG. 2A, with the exemplary method of the present invention an array z is used to store the normalizing factors, and an array sum is used for all the un-normalized conditional probabilities sum[i, y]. Thus, one may only need to modify those sum[i, y] that satisfy $f^*(x_i, y) \neq 0$, and to make changes to their corresponding normalizing factors z[i]. The different values in the exemplary SGC pseudo code may be computed or determined as follows.

The following is denoted:

$$\text{sum}(y|x) = \exp\left(\sum_i \lambda_i f_i^s(x, y)\right)$$

$$Z(x) = \sum_y \text{sum}(y|x)$$

Assuming the selected feature set is S, and feature f is currently being considered, the un-normalized component and the normalization factor may have the following recursive forms for computing Z and feature set S:

$$\text{sum}_{S \cup f}^\alpha(y|x) = \text{sum}_S^\alpha(y|x) e^{\alpha f(x,y)}$$

$$Z_{S \cup f}^\alpha(x) = Z_S(x) - \text{sum}_s(y|x) + \text{sum}_{S \cup f}(y|x)$$

The approximate gain of the log likelihood is computed or determined as follows:

$$G_{S \cup f}(\alpha) = L(p_{S \cup f}^\alpha) - L(p_S)$$

$$= \alpha \tilde{E}(f^s) - \tilde{p}(x) \log\left(\frac{Z_{S \cup f}^\alpha(x)}{Z_S(x)}\right)$$

The maximum approximate gain and its corresponding weight $\alpha$ are represented as:

$$\sim \Delta L(S, f) = \max_\alpha G_{S \cup f}(\alpha)$$

$$\sim \alpha(S, f) = \arg\max_\alpha G_{S \cup f}(\alpha)$$

After selecting the features the model parameters $\lambda_i$ are estimated. The weights will be maximum likelihood estimates from the training data. Since the format of the model/method is not changed from the traditional exponential model, the Kuhn-Tucker theorem still applies to this model and the maximum likelihood estimate will be equivalent to the maximum entropy model subject to the feature expectation constraints with difference that soft feature values should be used in equations (1) to (3).

Figure 2B:
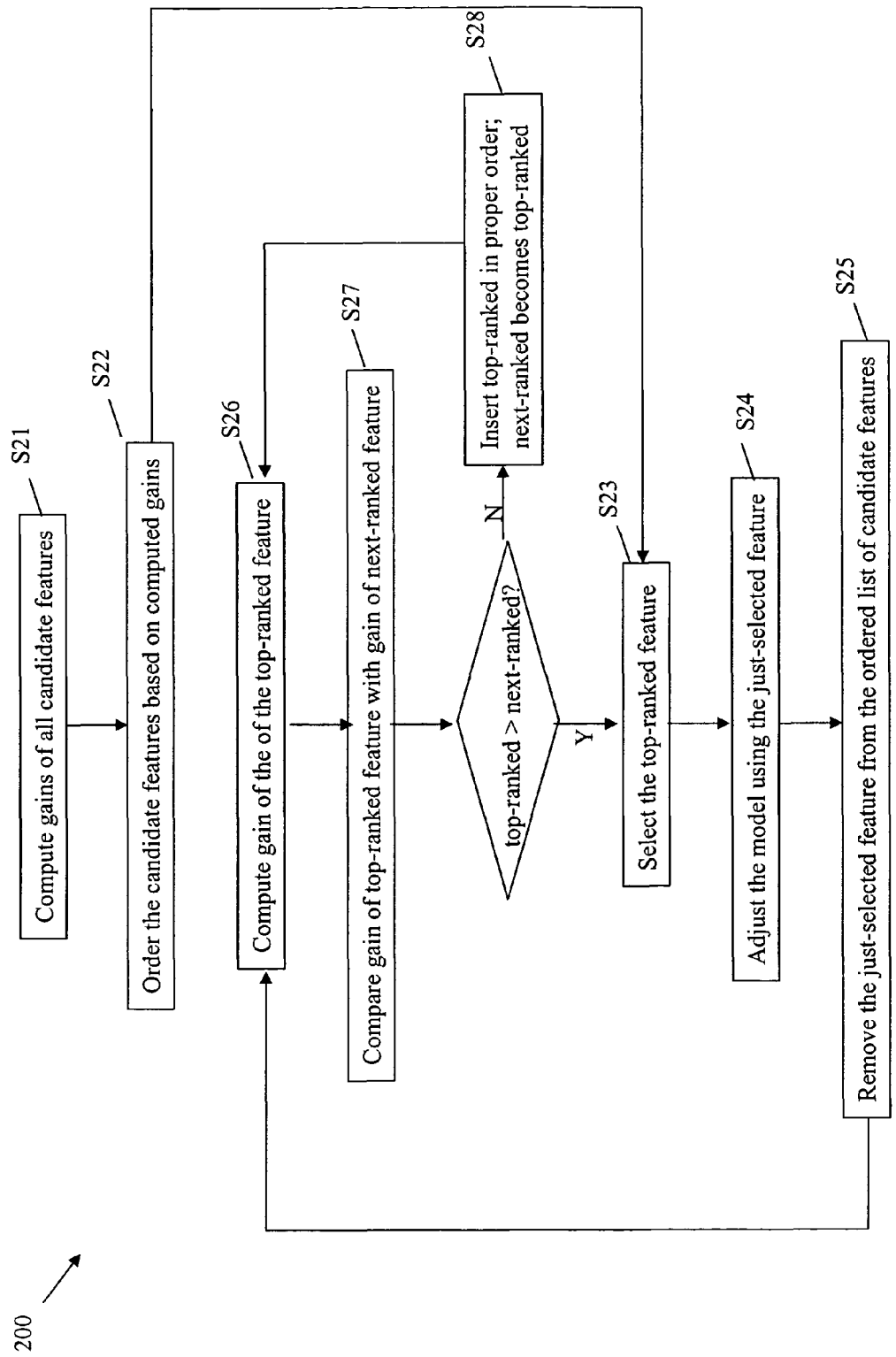
FIG. 2B shows an exemplary flow chart, which be may used in the exemplary system and processing arrangement of FIG. 1A, describing the feature selection steps for the pseudo-code of the exemplary selective gain computation (SGC) method of FIG. 2A.

FIG. 2B shows an exemplary flow chart 200, which may used in the exemplary processing arrangement and system of FIG. 1A, describing the feature selection steps for the pseudo code of the exemplary selective gain computation (SGC) method. In step S21, the system computes and/or determines gains of all candidate features. In step S22, the system orders candidate features based on the their corresponding computed gains, where, for example, the feature with the highest gain is ranked first and the feature with the lowest gain is ranked last. The ordered list may be stored, for example, in an array referred to, for example, as the gain array. In step S23, the system selects the top-ranked feature with the highest gain. In step S24, the system adjusts the model using the just-selected feature. In step S25, the system removes the selected feature from the ordered list of candidate features. In step S26, the system computes and/or determines the gain of the top-ranked feature of the ordered list of candidate features. In step S27, the system compares the gain of the top-ranked feature with the gain of the next-ranked feature in the ordered list of candidate features. If the gain of the top-ranked feature gain is greater than the gain of next-ranked feature, then the SGC method proceeds to step S23 in the system, otherwise, if the gain of the top-ranked feature is less than the gain of the next-ranked feature, the SGC method proceeds to step S28 in the system, in which the top-ranked feature is repositioned in the ordered list so that the next-ranked feature becomes the new top-ranked feature and the proper order of the list is maintained—that is, the former top-ranked feature is moved from the highest position in the ordered list to the proper-ranked position based on the recently computed gain. Thereafter, the SGC method returns to step S26 to compute and/or determine the gain of the newly-ranked top feature in the order list of candidate features.

For the purpose of determining maximum likelihood estimation of model parameters, the Sequential Conditional Generalized Iterative Scaling (SCGIS) technique from Joshua Goodman, "Sequential Conditional Generalized Iterative Scaling", Association for Computational Linguistics, Philadelphia, Pa., 2002 ("Goodman (2002)") may be used, and is incorporated by reference. This technique is a fast version of the Generalized Iterative Scaling technique referred to in Adam L. Berger, Stephen A. Della Pietra, and Vincent J. Della Pietra, "A Maximum Entropy Approach to Natural Language Processing", Computational Linguistic, 22 (1): 39-71, 2000 ("Berger et al. (1996)"), which may also be used for maximum likelihood estimation, and is incorporated by reference. In the Generalized Iterative Scaling (GIS) technique referred to in Goodman 2002, at each iteration, a step is taken in a direction that increases the likelihood of the training data. Here, the likelihood of the training data increases at each iteration and eventually converges to the global optimum. As an improvement to the GIS technique, in SCGIS, rather than learning all parameters of the model simultaneously, they are learned sequentially which improves the speed of the technique.

FIG. 3 shows an exemplary Sequential Conditional Generalized Iterative Scaling (SCGIS) method, which is similar to the Sequential Conditional Generalized Iterative Scaling technique of Goodman 2002 except for modifications in the update equations to incorporate the soft features. Here, as with the Sequential Conditional Generalized Iterative Scaling technique of Goodman 2002, rather than attempt to train all model parameters simultaneously, the exemplary Sequential Conditional Generalized Iterative Scaling method of the present invention trains them sequentially. However, unlike the Sequential Conditional Generalized Iterative Scaling technique of Goodman 2002, instances of the feature function f are replaced with a soft feature function $\tilde{f}$ when computing expected counts and sum.

More specifically, as shown in FIG. 3, with the method and system of the present invention a normalization factor array z of a size equal to the number of training instances I is set to equal the number of output classes Y, and a sample matrix array s of a size equal to the number of training instances I by the number of output classes Y is set to 0. Thereafter, for each feature function $f_i$ (i.e., for each iteration) the expected value is initialized to 0, and for each output y and for each training instance j such that $f_i(\bar{x}j,y) \neq 0$, the expected value is updated based at least on part on the soft feature function $\tilde{f}$, an error $\delta_i$ of the ith feature for this iteration is calculated based on the updated expected value, an observed value, and the soft feature function $\tilde{f}$, a corresponding weight $\lambda_j$ of the ith feature for this iteration is modified based on the calculated error $\delta_i$, and then again for each output y and for each training instance j such that $f_i(\bar{x}j, y) \neq 0$, the normalization factor array z and sample array matrix s are updated based on the calculated error $\delta_i$ and the soft feature function $\tilde{f}$.

The exemplary method according to the present invention has been tested in the context of an in-car MP3-player natural language interaction system, which conducts a natural dialog between the human user and the MP3-player regarding all types of playback functions and knowledge management, and takes appropriate actions implied from the dialog. Part of the system is a CME-based topic classifier that takes the recognized text as input and aims at classifying the utterance into of the 24 semantic classes.

In the preceding specification, the present invention has been described with reference to specific example embodiments thereof. It will, however, be evident that various modifications and changes may be made thereunto without departing from the broad spirit and scope of the present invention, as set described in the present application.

What is claimed is:

1. A computer-implemented method for providing conditional maximum entropy modeling, comprising:
   constructing, by a computer processor, a conditional maximum entropy model; and
   incorporating, by the computer processor, an observation confidence score into the model to reduce an effect due to an uncertain observation;
   wherein:
   a candidate feature derived from a corpus of data is incorporated into the model based on a level of uncertainty regarding the feature; and
   a contribution of a less confident feature is reduced in proportion to the level of uncertainty regarding the less confident feature.

2. A computer-implemented method for providing conditional maximum entropy modeling, comprising:
   constructing, by a computer processor, a conditional maximum entropy model;
   incorporating, by the computer processor, an observation confidence score into the model to reduce an effect due to an uncertain observation; and
   incorporating, by the computer processor, soft features into the conditional maximum entropy model;

wherein:
the conditional maximum entropy model is constructed as follows:

$$p(y|x) = \frac{1}{Z_\lambda(x)} \exp\left(\sum_i \lambda_i f_i(x, y)\right)$$

$$Z_\lambda(x) = \sum_y \exp\left(\sum_i \lambda_i f_i(x, y)\right);$$

$f_i(x,y)$ is a feature function that describes a certain event (x,y);

$Z_\lambda(x)$ is a normalization factor;

$\lambda_i$ is a weight to the ith feature function; and p(y|x) is the resulting conditional probability distribution that maximizes the entropy.

3. The method of claim 2, wherein the soft features are incorporated in the conditional maximum entropy model as follows:

$$p(y|x, s) = \frac{1}{Z_\lambda(x, s)} \exp\left(\sum_i \lambda_i f_i^s(x, y)\right)$$

$$Z_\lambda(x, s) = \sum_y \exp\left(\sum_i \lambda_i f_i^s(x, y)\right)$$

where $f_i^s(x,y)$ is a soft feature function, $\lambda_j$ is a corresponding weight of the ith feature, Z(x,s) is a normalization factor, and p(y|x,s) is the resulting conditional probability distribution.

4. The method of claim 3, wherein the soft feature function $f_i^s(x,y)$ can vary continuously in an interval from 0 to 1, in which values near 1 indicate a confident score and values near 0 indicate a non-confident score.

5. The method of claim 4, wherein a sigmoid function is used to map the log-likelihood of the resulting conditional probability distribution.

6. The method of claim 5, wherein the sigmoid function as follows:

$$f_i^s(x,y) = f_i(x,y) \text{sigmoid}(\log p(\vec{s} | f_i(x,y)=1))$$

where $\vec{s}$ is a confidence score vector.

7. The method of claim 6, wherein a beta distribution is used to relate a value of the soft feature function $f_i^s(x,y)$ with respect to the confidence score vectors $\vec{s}$.

8. The method of claim 7, wherein the beta distribution as follows:

$$p(\vec{s} | f_i(x, y) = 1) = \prod_j Beta^{\alpha_j, \beta_j}(s_j)$$

where j varies over all significant positions of the i-th feature, and $\alpha_j, \beta_j$ are the maximum likelihood estimates of the beta distribution parameters, which are estimated from training data as follows:

$$\alpha_j = \bar{s}_j \left[\frac{\bar{s}_j(1 - \bar{s}_j)}{\hat{s}_j^2} - 1\right]$$

$$\beta_j = (1 - \bar{s}_j)\left[\frac{\bar{s}_j(1 - \bar{s}_j)}{\hat{s}_j^2} - 1\right]$$

where $\bar{s}_j$ is the sample mean of the position j scores where feature i is on and $\hat{s}_j^2$ is the corresponding sample variance.

9. The method of claim 8, wherein a flat distribution for $s_j$ indicates that the feature is less affected by that score, and a concentrated distribution for $s_j$ indicates the feature should be included in the model when the score is near the distribution mean and should not be included as the score deviates from the mean.

10. The method of claim 4, wherein the soft features are incorporated into feature selection for training the conditional maximum entropy model.

11. The method of claim 10, wherein the feature selection includes:
determining gains for candidate features during an initialization stage and for only top-ranked features during each feature selection stage;
ranking the candidate features in an ordered list based on the determined gains;
selecting a top-ranked feature in the ordered list with a highest gain; and
adjusting the conditional maximum entropy model using the selected top-ranked feature only if the top-ranked feature has an associated observation confidence score above a predetermined value.

12. The method of claim 10, wherein the soft features are incorporated into parameter estimation.

13. The method of claim 12, wherein the parameter estimation includes:
setting elements of a normalization factor array equal to a number of output classes, the normalization factor array having a size equal to a number of training instances;
setting elements of a sample matrix array to zero, the sample matrix array having a size equal to the number of training instances by the number of output classes; and
for each feature:
initializing an expected value to zero; and
for each output and training instance such that the feature does not equal zero:
updating the expected value based on a soft feature;
calculating an error of the feature based on the updated expected value, an observed value, and the soft feature;
modifying a corresponding weight of the feature based on the calculated error; and
updating the normalization factor array and the sample array matrix based on the calculated error and the soft feature.

14. A processing arrangement system to perform maximum entropy modeling in which one or more candidate features derived from a corpus of data are incorporated into a model that predicts linguistic behavior, the system comprising:
a gain computation arrangement to determine gains for the candidate features;
a feature ranking arrangement to rank the features based on the determined gain;

a feature selection arrangement to select a feature with a highest gain;

a parameter estimation arrangement to estimate weighting factors for each selected feature; and a model adjustment arrangement to adjust the model using the selected feature based on a level of uncertainty regarding the feature;

wherein the model adjustment arrangement reduces a contribution of a less confident feature in proportion to a level of uncertainty regarding the less confident feature.

15. A processing arrangement system to perform maximum entropy modeling in which one or more candidate features derived from a corpus of data are incorporated into a model that predicts linguistic behavior, the system comprising:

a gain computation arrangement to determine gains for the candidate features;

a feature ranking arrangement to rank the features based on the determined gain;

a feature selection arrangement to select a feature with a highest gain;

a parameter estimation arrangement to estimate weighting factors for each selected feature; and a model adjustment arrangement to adjust the model using the selected feature based on a level of uncertainty regarding the feature;

wherein at least one of the feature selection arrangement, the parameter estimation arrangement, and the model adjustment arrangement incorporates a soft feature.

16. The system of claim 15, wherein the soft feature can vary continuously in an interval from 0 to 1, in which values near 1 indicate a confident score and values near 0 indicate a non-confident score.

17. A computable readable medium having program code executable on a process arrangement for performing the following:

constructing a conditional maximum entropy model; and incorporating an observation confidence score into the model to reduce an effect due to an uncertain observation;

wherein a candidate feature derived from a corpus of data is incorporated into the model based on a level of uncertainty regarding the feature, and wherein a contribution of a less confident feature is reduced in proportion to the level of uncertainty regarding the less confident feature.

* * * * *